US011796723B2

(12) United States Patent
Tu

(10) Patent No.: US 11,796,723 B2
(45) Date of Patent: Oct. 24, 2023

(54) OPTICAL DEVICES

(71) Applicant: VisEra Technologies Company Limited, Hsin-Chu (TW)

(72) Inventor: Zong-Ru Tu, Zhubei (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 307 days.

(21) Appl. No.: 17/199,987

(22) Filed: Mar. 12, 2021

(65) Prior Publication Data

US 2022/0291431 A1 Sep. 15, 2022

(51) Int. Cl.
*G02B 5/20* (2006.01)
*G02B 5/18* (2006.01)

(52) U.S. Cl.
CPC .......... *G02B 5/208* (2013.01); *G02B 5/1809* (2013.01); *G02B 5/1819* (2013.01)

(58) Field of Classification Search
CPC .... G02B 5/208; G02B 5/1809; G02B 5/1819; G02B 5/20; G02B 5/201; G02B 5/203; G02B 5/204; G02B 5/18; G02B 5/1814; G02B 5/1823; G02B 5/1857; G02B 5/1866; G02B 2005/1804; G02B 27/4272; H01Q 15/0006
See application file for complete search history.

(56) References Cited

U.S. PATENT DOCUMENTS

2007/0045685 A1* 3/2007 Yang ................. H01L 27/14627 257/292
2007/0298533 A1* 12/2007 Yang ................. H01L 27/14625 438/57
2009/0272880 A1* 11/2009 Stanton ............ H01L 27/14621 257/E31.127
2016/0195429 A1* 7/2016 Boettiger ............. G01J 3/0259 250/208.2
2019/0206917 A1* 7/2019 Nakajiki ................ H04N 25/76
2020/0013821 A1* 1/2020 Oota .................. H01L 27/1462

FOREIGN PATENT DOCUMENTS

CN 110137195 A 8/2019
CN 110729314 A 1/2020
CN 111048535 A 4/2020
TW 201114024 A 4/2011

OTHER PUBLICATIONS

Office Action dated Mar. 28, 2022 in TW Application No. 110120860, 4 pages.

* cited by examiner

*Primary Examiner* — Derek S. Chapel
*Assistant Examiner* — Adam W Booher
(74) *Attorney, Agent, or Firm* — Muncy, Geissler, Olds & Lowe, P.C.

(57) ABSTRACT

An optical device is provided. The optical device includes a plurality of IR-cut pixels, a plurality of IR-pass pixels, and a plurality of grids. The grids surround the IR-cut pixels and the IR-pass pixels. Each IR-cut pixel includes a first grating structure. A method for fabricating the optical device is also provided.

16 Claims, 15 Drawing Sheets

| | | | | |
|---|---|---|---|---|
| R11 | | | | R15 |
| | R22 | | | |
| | | 110 | | |
| | | | | |
| R51 | | | | R55 |

200

| | | | | |
|---|---|---|---|---|
| W11 | W12 | W13 | W14 | W15 |
| W21 | W22 | W23 | W24 | W25 |
| W31 | W32 | W33 | W34 | W35 |
| W41 | W42 | W43 | W44 | W45 |
| W51 | W52 | W53 | W54 | W55 |

| | | | | |
|---|---|---|---|---|
| R11 | | | | R15 |
| | R22 | | | |
| | | 110 | | |
| | | | | |
| R51 | | | | R55 |

OPTICAL DEVICES

BACKGROUND OF THE INVENTION

Field of the Invention

The invention relates to an optical device, and more particularly to an optical device with a grating structure in an IR-cut pixel.

Description of the Related Art

Demand for non-visible, especially near-infrared (NIR) sensitive image sensors for security, personal authentication and range finding applications has been growing. To make image sensors applicable for NIR use, it is important to enhance NIR sensitivity. One approach to improve NIR sensitivity is to arrange IR-pass filters in pixels. But this degrades the visible image quality due to lateral crosstalk.

Therefore, development of an optical device capable of reducing crosstalk is desirable.

BRIEF SUMMARY OF THE INVENTION

In accordance with one embodiment of the invention, an optical device is provided. The optical device includes a plurality of IR-cut pixels, a plurality of IR-pass pixels, and a plurality of grids. The grids surround the IR-cut pixels and the IR-pass pixels. Each IR-cut pixel includes a first grating structure.

In some embodiments, the first grating structure has a pitch which is in a range from 0.1 μm to 0.7 μm and a height which is in a range from 0.05 μm to 0.5 μm. In some embodiments, each IR-cut pixel further includes an IR-cut filter covering and filling in the first grating structure. In some embodiments, each IR-cut pixel further includes a color filter disposed on the IR-cut filter.

In some embodiments, each IR-cut pixel further includes a color filter covering and filling in the first grating structure. In some embodiments, each IR-cut pixel further includes an IR-cut filter disposed on the color filter.

In some embodiments, each IR-pass pixel includes an IR-pass filter. In some embodiments, each IR-pass pixel includes a color filter.

In some embodiments, the optical device further includes a plurality of microlenses above the IR-cut pixels and the IR-pass pixels.

In some embodiments, each IR-cut pixel further includes an IR-pass filter, and the first grating structure is disposed on a top surface of the IR-pass filter. In some embodiments, the first grating structure has a pitch which is in a range from 0.1 μm to 0.7 μm. In some embodiments, the pitch is defined by $\lambda/\sin\theta$, wherein $\lambda$ is a wavelength of an incident light, and $\theta$ is a diffraction angle of the incident light through the first grating structure. In some embodiments, $\theta$ is defined by $\tan^{-1} D/x$, wherein D is a thickness of the IR-pass filter, and x is a distance from a center of the IR-cut pixel to a position where the incident light enters an adjacent IR-pass pixel after diffraction.

In some embodiments, the first grating structure includes a plurality of separated portions, and the separated portions have variable height and spacing.

In some embodiments, each IR-cut pixel further includes a second grating structure under the first grating structure. In some embodiments, each IR-cut pixel further includes an IR-cut filter covering and filling in the second grating structure. In some embodiments, each IR-cut pixel further includes a color filter covering and filling in the second grating structure.

In some embodiments, each grid includes low-refractive-index organic material. In some embodiments, the first grating structure and the grids have the same material.

In accordance with one embodiment of the invention, a method for fabricating an optical device is provided. The fabrication method includes the following steps. A substrate with a plurality of grids is provided. A part of the grids is etched to form a plurality of grating structures, leaving a part of the grids to define a plurality of IR-cut pixels and a plurality of IR-pass pixels. Each IR-cut pixel includes a grating structure. An IR-cut filter is formed to cover and fill in the grating structure in each IR-cut pixel. A color filter is formed on the IR-cut filter in each IR-cut pixel. An IR-pass filter is formed in each IR-pass pixel.

The present invention provides the grating structure with the specific dimensions, for example the specific pitch and height, located on the substrate within the IR-cut pixel. When IR light enters the grating structure, the IR light forms a resonance (wave-guide) mode within the grating structure and then reflects out the IR-cut pixel. The setting of the grating structure is capable of reducing the penetration of the IR light and increasing the reflectivity of the IR light in the IR-cut pixel. Therefore, the pixel (ex. the IR-cut pixel) that does not expect IR light to penetrate will not receive IR light, effectively reducing crosstalk. That is, the ability of the IR-cut pixel to filter out IR light is greatly improved.

In the present invention, the grating structure with a proper dimension located in and exposed from the extended IR-pass filter within the IR-cut pixel provides an improved light-splitting effect. When incident light with different wavelengths passes through the grating structure, different diffraction angles are produced from the incident light. Especially, long-wavelength incident light (ex. IR light) has a large diffraction angle. Therefore, when IR light is diffracted and enters the IR-pass filter, with the low-n grid having a proper height, the IR light can thus be trapped inside the IR-pass filter, improving the reception of IR-light image information of the IR-pass pixel.

In addition, all the required image information, for example red-light information, green-light information, blue-light information and all-light information, in each target pixel can be reproduced by the algorithm (combined with the weighting factor matrix and the color-filter mosaic pattern) provided by the present invention. Therefore, the optical device can present the most realistic colors.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 10 is a top view of an arrangement of a color-filter mosaic pattern in accordance with one embodiment of the invention;

FIG. 11 is a top view of an arrangement of a color-filter mosaic pattern in accordance with one embodiment of the invention;

FIG. 12 is a top view of an arrangement of a color-filter mosaic pattern in accordance with one embodiment of the invention;

FIG. 13 is a top view of an arrangement of a color-filter mosaic pattern in accordance with one embodiment of the invention;

DETAILED DESCRIPTION OF THE INVENTION

Figure 1:
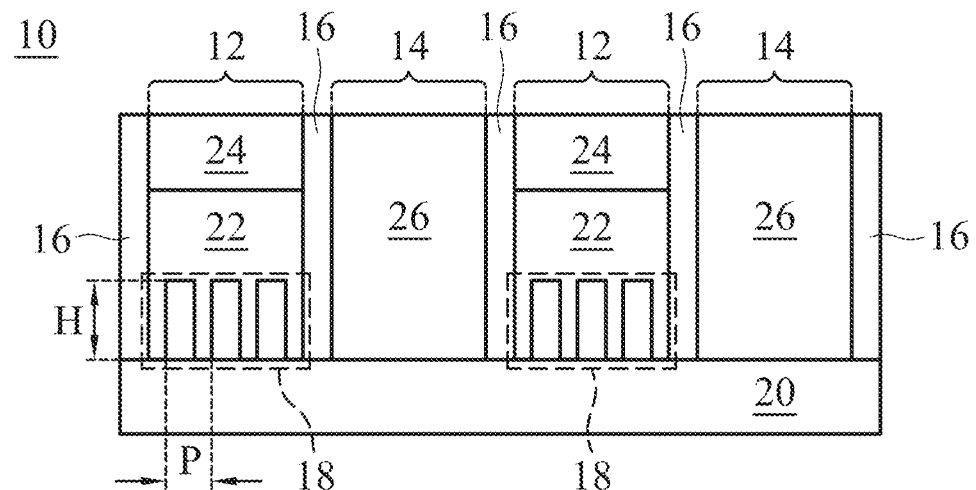
FIG. 1 is a cross-sectional view of an optical device in accordance with one embodiment of the invention.

The optical device of the present invention is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as “first material layer disposed on/over a second material layer”, may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, “lower”, “bottom”, “higher” or “top” are used to describe the position of one element relative to another. It should be appreciated that if a device is flipped upside down, an element that is “lower” will become an element that is “higher”.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as “lower,” “upper,” “horizontal,” “vertical,”, “above,” “below,” “up,” “down,” “top” and “bottom” as well as derivative thereof (e.g., “horizontally,” “downwardly,” “upwardly,” etc.) should be construed as referring to the orientation as described or as shown in the drawing under discussion. These relative terms are for convenience of description and do not require that the apparatus be constructed or operated in a particular orientation. Terms concerning attachments, coupling and the like, such as “connected” and “interconnected,” refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Herein, the terms “about”, “around” and “substantially” typically mean +/−20% of the stated value or range, typically +/−10% of the stated value or range, typically +/−5% of the stated value or range, typically +/−3% of the stated value or range, typically +/−2% of the stated value or range, typically +/−1% of the stated value or range, and typically +/−0.5% of the stated value or range. The stated value of the present disclosure is an approximate value. Namely, the meaning of “about”, “around” and “substantially” may be implied if there is no specific description of “about”, “around” and “substantially”.

The following description is of the best-contemplated mode of carrying out the invention. This description is made for the purpose of illustrating the general principles of the invention and should not be taken in a limiting sense. The scope of the invention is best determined by reference to the appended claims.

Referring to FIG. 1, in accordance with one embodiment of the present invention, an optical device 10 is provided. FIG. 1 shows a cross-sectional view of the optical device 10.

As shown in FIG. 1, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 1, the grating structure 18 is disposed on the substrate 20. The pitch P of the grating structure 18 is in a range from about 0.1 μm to about 0.7 μm. The height H of the grating structure 18 is in a range from about 0.05 μm to about 0.5 μm. In some embodiments, the material of the grating structure 18 is the same as that of the grid 16, for example, a low-refractive-index organic material. The grating structure 18 is designed for filtering out IR light (such as 850 nm or 940 nm), but the present invention is not limited thereto. When IR light enters the grating structure 18, due to the grating structure 18 with the specific dimensions, for example, the specific pitch and height, the IR light forms a resonance (wave-guide) mode within the grating structure 18 and then reflects out. It can be said that the penetration of the IR light in the IR-cut pixel 12 is very low, and the reflectivity thereof is very high. Therefore, it can ensure that the pixel (ex. the IR-cut pixel 12) that does not expect IR light to penetrate will not receive IR light, effectively reducing crosstalk. In FIG. 1, due to the setting of the grating structure 18, the ability of the IR-cut pixel 12 to filter out IR light is greatly improved.

In FIG. 1, each IR-cut pixel 12 includes an IR-cut filter 22 and a color filter 24. The IR-cut filter 22 covers and fills in the grating structure 18. The color filter 24 is disposed on the IR-cut filter 22. Each IR-pass pixel 14 includes an IR-pass filter 26. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Figure 2:
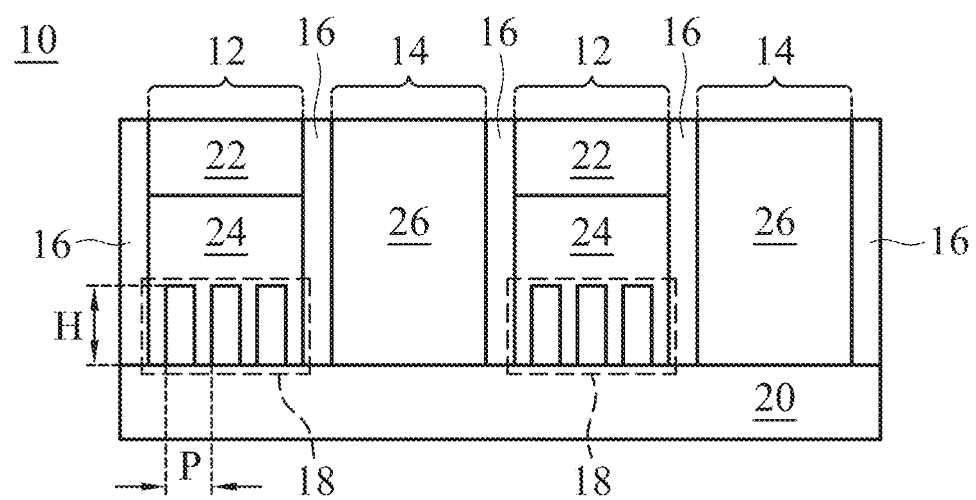
FIG. 2 is a cross-sectional view of an optical device in accordance with one embodiment of the invention.

Referring to FIG. 2, in accordance with one embodiment of the present invention, an optical device 10 is provided. FIG. 2 shows a cross-sectional view of the optical device 10.

As shown in FIG. 2, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 2, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 2, each IR-cut pixel 12 includes an IR-cut filter 22 and a color filter 24. The color filter 24 covers and fills in the grating structure 18. The IR-cut filter 22 is disposed on the color filter 24. Each IR-pass pixel 14 includes an IR-pass filter 26. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Figure 3:
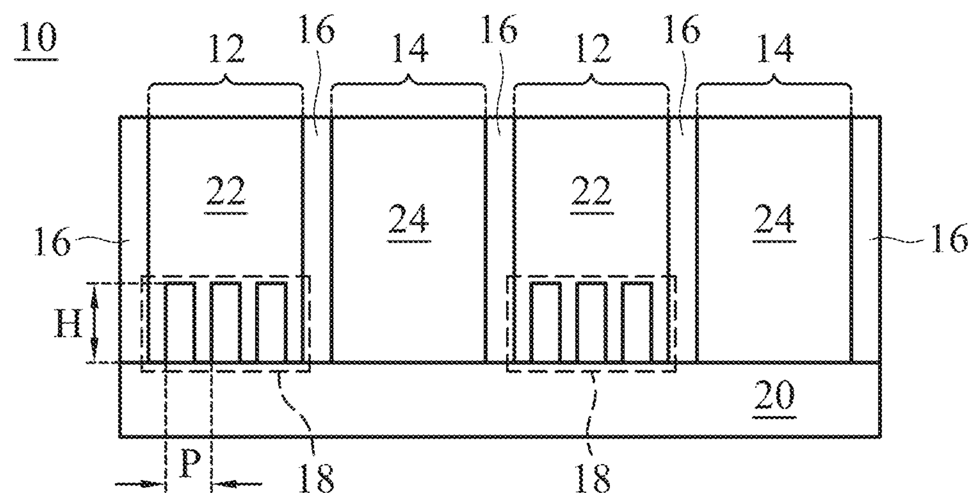
FIG. 3 is a cross-sectional view of an optical device in accordance with one embodiment of the invention.

Referring to FIG. 3, in accordance with one embodiment of the present invention, an optical device 10 is provided. FIG. 3 shows a cross-sectional view of the optical device 10.

As shown in FIG. 3, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 3, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 3, each IR-cut pixel 12 includes an IR-cut filter 22. The IR-cut filter 22 covers and fills in the grating structure 18. Each IR-pass pixel 14 includes a color filter 24. In some embodiments, the IR-cut filter 22 represents a filter that can filter out IR light. In some embodiments, the color filter 24 includes a red (R) color filter, a green (G) color filter or a blue (B) color filter.

Figure 4:
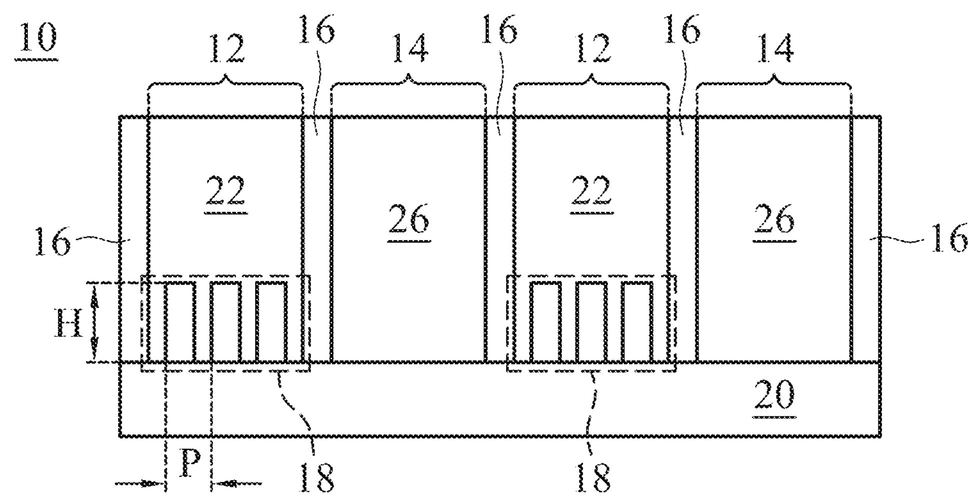
FIG. 4 is a cross-sectional view of an optical device in accordance with one embodiment of the invention.

Referring to FIG. 4, in accordance with one embodiment of the present invention, an optical device 10 is provided. FIG. 4 shows a cross-sectional view of the optical device 10.

As shown in FIG. 4, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 4, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 4, each IR-cut pixel 12 includes an IR-cut filter 22. The IR-cut filter 22 covers and fills in the grating structure 18. Each IR-pass pixel 14 includes an IR-pass filter 26. In some embodiments, the IR-cut filter 22 represents a filter that can filter out IR light. In some embodiments, the IR-pass filter 26 represents a filter that allows IR light to pass through.

Figure 5:
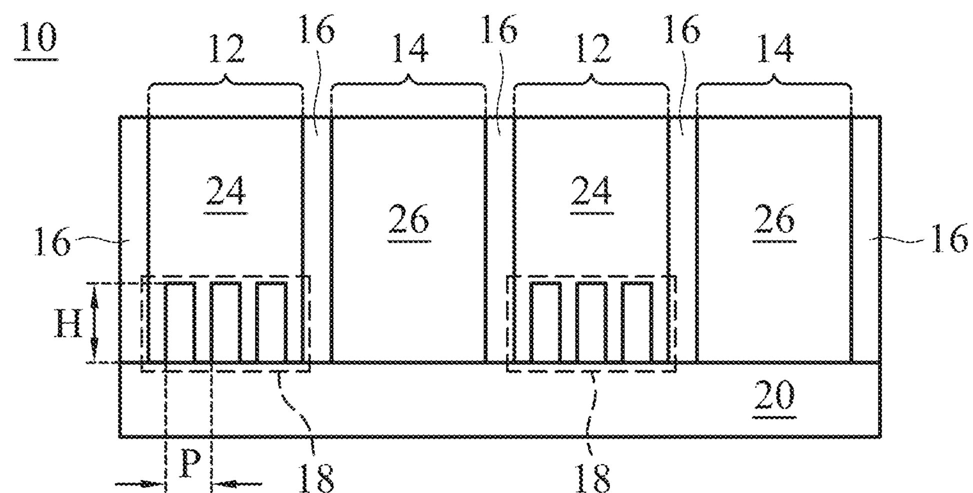
FIG. 5 is a cross-sectional view of an optical device in accordance with one embodiment of the invention.

Referring to FIG. 5, in accordance with one embodiment of the present invention, an optical device 10 is provided. FIG. 5 shows a cross-sectional view of the optical device 10.

As shown in FIG. 5, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 5, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 5, each IR-cut pixel 12 includes a color filter 24. The color filter 24 covers and fills in the grating structure 18. Each IR-pass pixel 14 includes an IR-pass filter 26. In some embodiments, the color filter 24 includes a red (R) color filter, a green (G) color filter or a blue (B) color filter. In some embodiments, the IR-pass filter 26 represents a filter that allows IR light to pass through.

Figure 6:
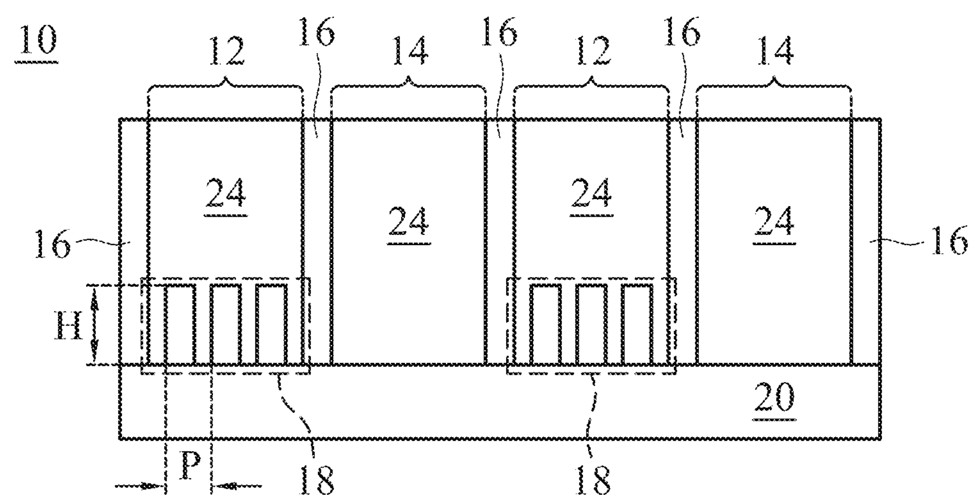
FIG. 6 is a cross-sectional view of an optical device in accordance with one embodiment of the invention.

Referring to FIG. 6, in accordance with one embodiment of the present invention, an optical device 10 is provided. FIG. 6 shows a cross-sectional view of the optical device 10.

As shown in FIG. 6, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 6, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 6, each IR-cut pixel 12 includes a color filter 24. The color filter 24 covers and fills in the grating structure 18. Each IR-pass pixel 14 includes a color filter 24. In some embodiments, the color filter 24 includes a red (R) color filter, a green (G) color filter or a blue (B) color filter.

Figure 7:
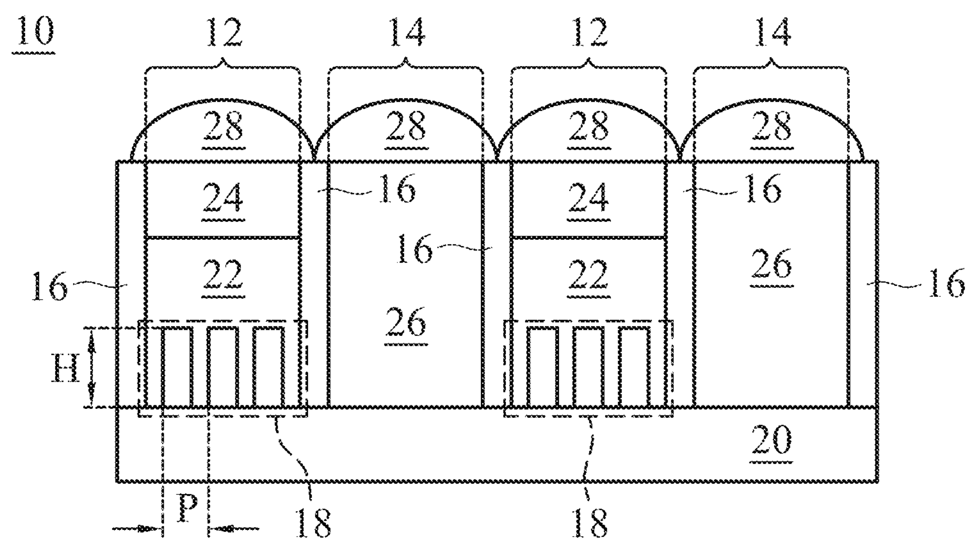
FIG. 7 is a cross-sectional view of an optical device in accordance with one embodiment of the invention.

Referring to FIG. 7, in accordance with one embodiment of the present invention, an optical device 10 is provided. FIG. 7 shows a cross-sectional view of the optical device 10.

As shown in FIG. 7, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 7, the grating structure 18 is disposed on the substrate 20. The dimensions and material of the grating structure 18 are similar to those of the grating structure 18 in FIG. 1. It is not repeated here. The grating structure 18 is designed for filtering out IR light (such as 850 nm or 940 nm), but the present invention is not limited thereto.

In FIG. 7, each IR-cut pixel 12 includes an IR-cut filter 22 and a color filter 24. The IR-cut filter 22 covers and fills in the grating structure 18. The color filter 24 is disposed on the IR-cut filter 22. Each IR-pass pixel 14 includes an IR-pass filter 26. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

In FIG. 7, the optical device 10 further include a plurality of microlenses 28 covering the IR-cut pixels 12 and the IR-pass pixels 14 to facilitate the focusing of incident light.

Figure 8:
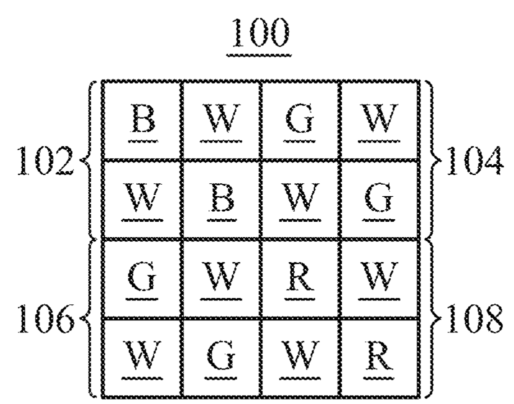
FIG. 8 is a top view of an arrangement of a color-filter mosaic pattern in accordance with one embodiment of the invention.

Referring to FIG. 8, in accordance with one embodiment of the present invention, a color-filter mosaic pattern 100 is provided. FIG. 8 shows a top view of the arrangement of the color-filter mosaic pattern 100.

As shown in FIG. 8, the color-filter mosaic pattern 100 may be regarded as a Bayer-like pattern. The color-filter mosaic pattern 100 includes a first color-filter group 102, a second color-filter group 104, a third color-filter group 106 and a fourth color-filter group 108. The first color-filter group 102 includes two blue color filters B and two IR-pass filters W, wherein the two blue color filters B are arranged diagonally to each other, and the two IR-pass filters W are arranged diagonally to each other. The second color-filter group 104 includes two green color filters G and two IR-pass filters W, wherein the two green color filters G are arranged diagonally to each other, and the two IR-pass filters W are arranged diagonally to each other. The third color-filter group 106 includes two green color filters G and two IR-pass filters W, wherein the two green color filters G are arranged diagonally to each other, and the two IR-pass filters W are arranged diagonally to each other. The fourth color-filter group 108 includes two red color filters R and two IR-pass filters W, wherein the two red color filters R are arranged diagonally to each other, and the two IR-pass filters W are arranged diagonally to each other.

Figure 9:
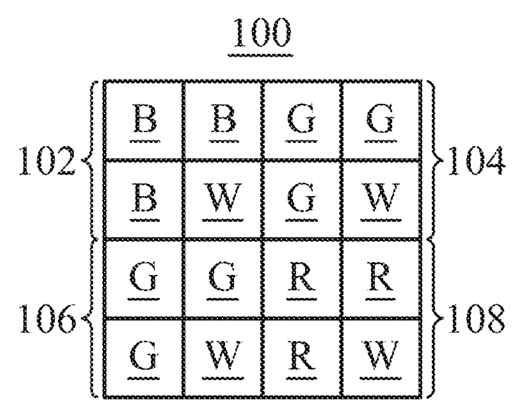
FIG. 9 is a top view of an arrangement of a color-filter mosaic pattern in accordance with one embodiment of the invention.

Referring to FIG. 9, in accordance with one embodiment of the present invention, a color-filter mosaic pattern 100 is provided. FIG. 9 shows a top view of the arrangement of the color-filter mosaic pattern 100.

As shown in FIG. 9, the color-filter mosaic pattern 100 may be regarded as a Bayer-like pattern. The color-filter mosaic pattern 100 includes a first color-filter group 102, a second color-filter group 104, a third color-filter group 106 and a fourth color-filter group 108. The first color-filter group 102 includes three blue color filters B and one IR-pass filter W, wherein one blue color filter B and the one IR-pass filter W are arranged diagonally to each other, and the other two blue color filters B are arranged diagonally to each other. The second color-filter group 104 includes three green color filters G and one IR-pass filter W, wherein one green color filter G and the one IR-pass filter W are arranged diagonally to each other, and the other two green color filters G are arranged diagonally to each other. The third color-filter group 106 includes three green color filters G and one IR-pass filter W, wherein one green color filter G and the one IR-pass filter W are arranged diagonally to each other, and the other two green color filters G are arranged diagonally to each other. The fourth color-filter group 108 includes three red color filters R and one IR-pass filter W, wherein one red color filter R and the one IR-pass filter W are arranged diagonally to each other, and the other two red color filters R are arranged diagonally to each other.

Figures 10, 11, 12, 13:
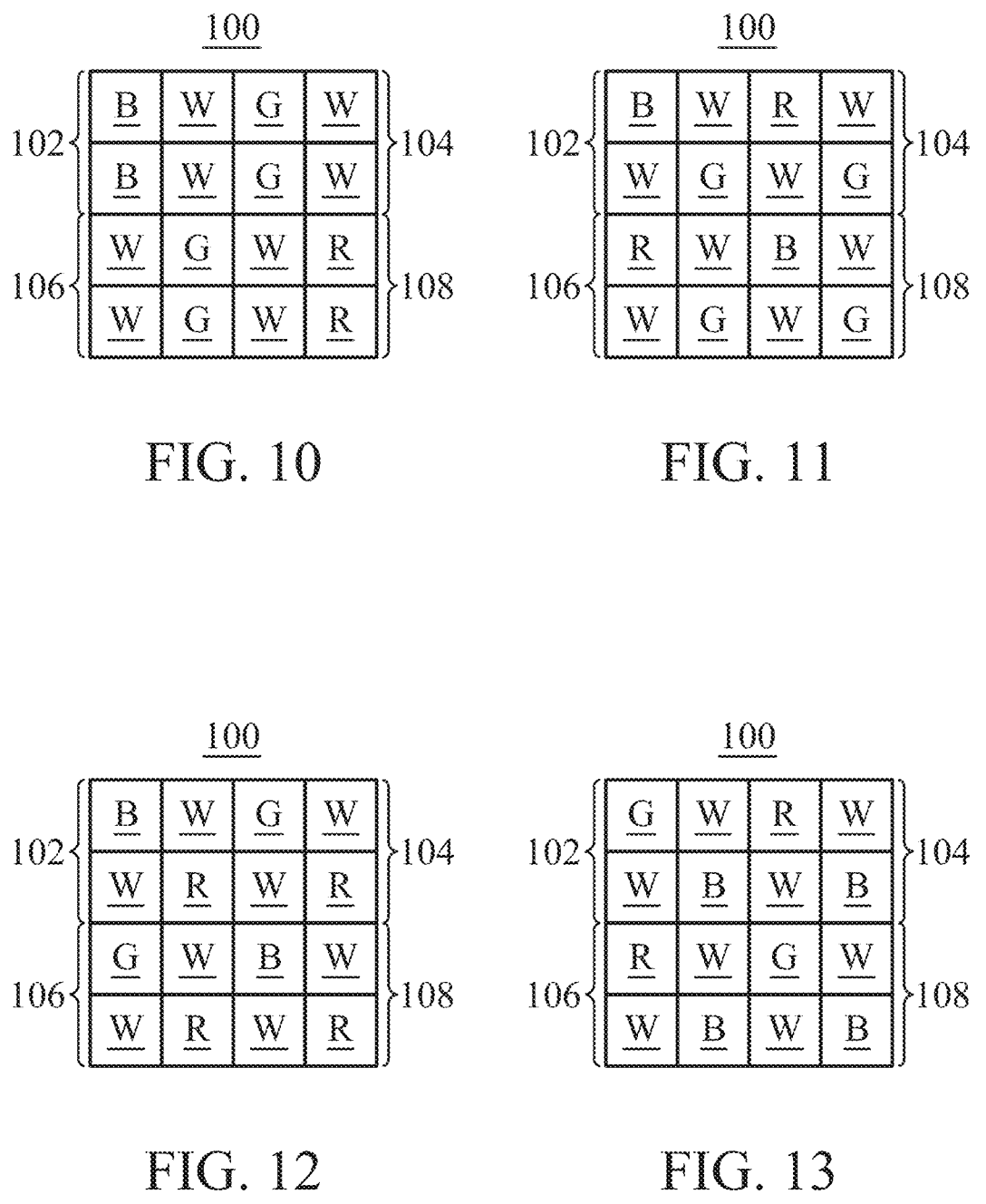

Referring to FIG. 10, in accordance with one embodiment of the present invention, a color-filter mosaic pattern 100 is provided. FIG. 10 shows a top view of the arrangement of the color-filter mosaic pattern 100.

As shown in FIG. 10, the color-filter mosaic pattern 100 may be regarded as a Bayer-like pattern. The color-filter mosaic pattern 100 includes a first color-filter group 102, a second color-filter group 104, a third color-filter group 106 and a fourth color-filter group 108. The first color-filter group 102 includes two blue color filters B and two IR-pass filters W, wherein one blue color filter B and one IR-pass filter W are arranged diagonally to each other, and another one blue color filter B and another one IR-pass filter W are arranged diagonally to each other. The second color-filter group 104 includes two green color filters G and two IR-pass filters W, wherein one green color filter G and one IR-pass filter W are arranged diagonally to each other, and another one green color filter G and another one IR-pass filter W are arranged diagonally to each other. The third color-filter group 106 includes two green color filters G and two IR-pass filters W, wherein one green color filter G and one IR-pass filter W are arranged diagonally to each other, and another one green color filter G and another one IR-pass filter W are arranged diagonally to each other. The fourth color-filter group 108 includes two red color filters R and two IR-pass filters W, wherein one red color filter R and one IR-pass filter W are arranged diagonally to each other, and another one red color filter R and another one IR-pass filter W are arranged diagonally to each other.

Referring to FIG. 11, in accordance with one embodiment of the present invention, a color-filter mosaic pattern 100 is provided. FIG. 11 shows a top view of the arrangement of the color-filter mosaic pattern 100.

As shown in FIG. 11, the color-filter mosaic pattern 100 may be regarded as a color-filter-mixed pattern. The color-filter mosaic pattern 100 includes a first color-filter group 102, a second color-filter group 104, a third color-filter group 106 and a fourth color-filter group 108. The first color-filter group 102 includes one blue color filter B, one green color filter G and two IR-pass filters W, wherein the one blue color filter B and the one green color filter G are arranged diagonally to each other, and the two IR-pass filters W are arranged diagonally to each other. The second color-filter group 104 includes one red color filter R, one green color filter G and two IR-pass filters W, wherein the one red color filter R and the one green color filter G are arranged diagonally to each other, and the two IR-pass filters W are arranged diagonally to each other. The third color-filter group 106 includes one red color filter R, one green color filter G and two IR-pass filters W, wherein the one red color filter R and the one green color filter G are arranged diagonally to each other, and the two IR-pass filters W are arranged diagonally to each other. The fourth color-filter group 108 includes one blue color filter B, one green color filter G and two IR-pass filters W, wherein the one blue color filter B and the one green color filter G are arranged diagonally to each other, and the two IR-pass filters W are arranged diagonally to each other.

Referring to FIG. 12, in accordance with one embodiment of the present invention, a color-filter mosaic pattern 100 is provided. FIG. 12 shows a top view of the arrangement of the color-filter mosaic pattern 100.

As shown in FIG. 12, the color-filter mosaic pattern 100 may be regarded as a color-filter-mixed pattern. The color-filter mosaic pattern 100 includes a first color-filter group 102, a second color-filter group 104, a third color-filter group 106 and a fourth color-filter group 108. The first color-filter group 102 includes one blue color filter B, one red color filter R and two IR-pass filters W, wherein the one blue color filter B and the one red color filter R are arranged diagonally to each other, and the two IR-pass filters W are arranged diagonally to each other. The second color-filter group 104 includes one green color filter G, one red color filter R and two IR-pass filters W, wherein the one green color filter G and the one red color filter R are arranged diagonally to each other, and the two IR-pass filters W are arranged diagonally to each other. The third color-filter group 106 includes one green color filter G, one red color filter R and two IR-pass filters W, wherein the one green color filter G and the one red color filter R are arranged diagonally to each other, and the two IR-pass filters W are arranged diagonally to each other. The fourth color-filter group 108 includes one blue color filter B, one red color filter R and two IR-pass filters W, wherein the one blue color filter B and the one red color filter R are arranged diagonally to each other, and the two IR-pass filters W are arranged diagonally to each other.

Referring to FIG. 13, in accordance with one embodiment of the present invention, a color-filter mosaic pattern 100 is provided. FIG. 13 shows a top view of the arrangement of the color-filter mosaic pattern 100.

As shown in FIG. 13, the color-filter mosaic pattern 100 may be regarded as a color-filter-mixed pattern. The color-filter mosaic pattern 100 includes a first color-filter group 102, a second color-filter group 104, a third color-filter group 106 and a fourth color-filter group 108. The first color-filter group 102 includes one green color filter G, one blue color filter B and two IR-pass filters W, wherein the one green color filter G and the one blue color filter B are arranged diagonally to each other, and the two IR-pass filters W are arranged diagonally to each other. The second color-filter group 104 includes one red color filter R, one blue color filter R and two IR-pass filters W, wherein the one red color filter R and the one blue color filter B are arranged diagonally to each other, and the two IR-pass filters W are arranged diagonally to each other. The third color-filter group 106 includes one red color filter R, one blue color filter B and two IR-pass filters W, wherein the one red color filter R and the one blue color filter B are arranged diagonally to each other, and the two IR-pass filters W are arranged diagonally to each other. The fourth color-filter group 108 includes one green color filter G, one blue color filter B and two IR-pass filters W, wherein the one green color filter G and the one blue color filter B are arranged diagonally to each other, and the two IR-pass filters W are arranged diagonally to each other.

Figures 14, 15, 16:
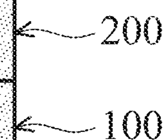
FIG. 14 is a top view of an arrangement of a color-filter mosaic pattern in accordance with one embodiment of the invention.
FIG. 15 shows a weighting factor matrix corresponding to a color-filter mosaic pattern in accordance with one embodiment of the invention.
FIG. 16 shows a combination of a weighting factor matrix and a color-filter mosaic pattern in accordance with one embodiment of the invention.

In FIGS. 8-13, the blue color filters B (regarded as B pixels) receive information of blue light. The green color filters G (regarded as G pixels) receive information of green light. The red color filters R (regarded as R pixels) receive information of red light. The IR-pass filters W (regarded as W pixels) receive information of all light. In order to reproduce all the required information (including the information of all light, red light, green light and blue light) in each pixel (including W pixels, R pixels, G pixels and B pixels), an algorithm is performed on the information actually extracted from each pixel. Referring to FIGS. 14-16, in accordance with one embodiment of the present invention, some required information of a target pixel is reproduced by algorithm. FIG. 14 is a top view of an arrangement of an exemplary color-filter mosaic pattern 100 (Bayer-like pattern). FIG. 15 shows a weighting factor matrix 200 corresponding to the color-filter mosaic pattern 100. FIG. 16 shows a combination of the weighting factor matrix 200 and the color-filter mosaic pattern 100. In FIG. 14, the distribution of red color filters, for example R11, R15, R22, R51 and R55, in the color-filter mosaic pattern 100 is shown. Specifically, the required red-light information of a target pixel 110 is calculated by collecting the information extracted from the red pixels, for example R11, R15, R22, R51 and R55, around the target pixel 110. In FIG. 15, the distribution of various weighting factors, for example W11, W12, W13, W14, W15, W21, W22, W23, W24, W25, W31, W32, W33, W34, W35, W41, W42, W43, W44, W45, W51, W52, W53, W54 and W55, in the weighting factor matrix 200 is shown. The weighting factor W33 corresponds to the weight "three". The weighting factors W22, W23, W24, W32, W34, W42, W43 and W44 corresponds to the weight "two". The weighting factors W11, W12, W13, W14, W15, W21, W25, W31, W35, W41, W45, W51, W52, W53, W54 and W55 corresponds to the weight "one". That is, the target pixel 110 corresponds to the weighting factor W33 with the weight three. The red pixel R11 corresponds to the weighting factor W11 with the weight one. The red pixel R15 corresponds to the weighting factor W15 with the weight one. The red pixel R22 corresponds to the weighting factor W22 with the weight two. The red pixel R51 corresponds to the weighting factor W51 with the weight one. The red pixel R55 corresponds to the weighting factor W55 with the weight one. In FIG. 16, the color-filter mosaic pattern 100 and the corresponding weighting factor matrix 200 are further combined to calculate the required red-light information of the target pixel 110 by the following formula.

$$R=(R11\times W11+R15\times W15+R22\times W22+R51\times W51+R55\times W55)/(W11+W15+W22+W51+W55)$$

In the formula, R represents the required red-light information of the target pixel 110. R11, R15, R22, R51 and R55 represent the red-light information extracted from the red pixels R11, R15, R22, R51 and R55 around the target pixel 110. W11, W15, W22, W51 and W55 represent the weighting factor corresponding to the red-light information extracted from the red pixels R11, R15, R22, R51 and R55. After the calculation, the required red-light information of the target pixel 110 is obtained.

In some embodiments, the required other information, for example green-light information, blue-light information and all-light information, of the target pixel 110 can also be calculated in the same way. In some embodiments, other pixels can also be designated as target pixels to calculate the required information thereof. After the algorithm, all the required information of each pixel can be reproduced. That is, the optical device can present the most realistic colors thereby.

Referring to FIGS. 17A-17E, in accordance with one embodiment of the present invention, a method for fabricating an optical device is provided. FIGS. 17A-17E show cross-sectional views of the method for fabricating an optical device.

Figure 17A:
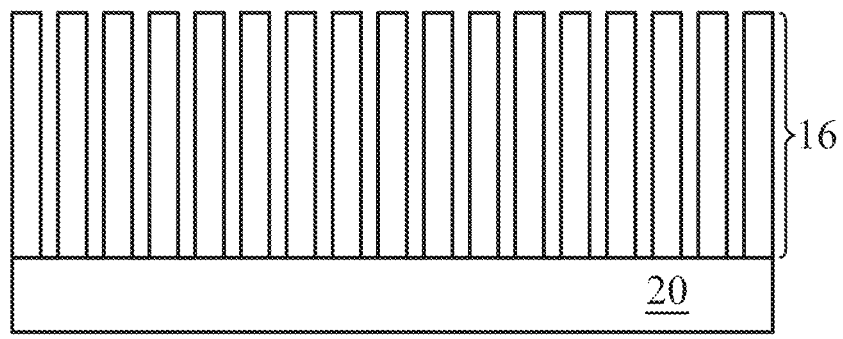
FIGS. 17A-17E are cross-sectional views of a method for fabricating an optical device in accordance with one embodiment of the invention.

First, as shown in FIG. 17A, a substrate 20 with a plurality of grids 16 disposed thereon is provided.

Figure 17B:
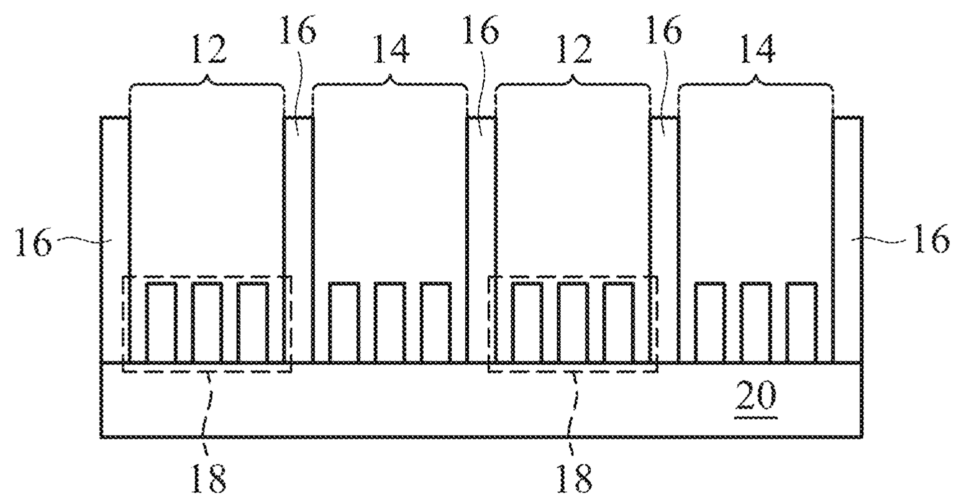

Next, as shown in FIG. 17B, a part of the grids 16 is etched to form a plurality of grating structures 18, leaving a part of the grids 16 to define a plurality of IR-cut pixels 12 and a plurality of IR-pass pixels 14. Specifically, each IR-cut pixel 12 includes one grating structure 18.

Figure 17C:
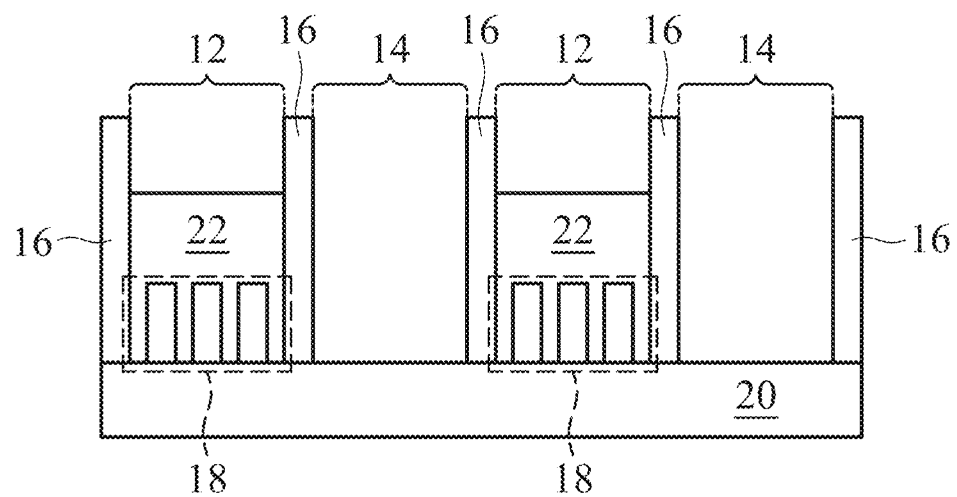

Next, as shown in FIG. 17C, an IR-cut filter 22 is formed to cover and fill in the grating structure 18 in each IR-cut pixel 12.

Figure 17D:
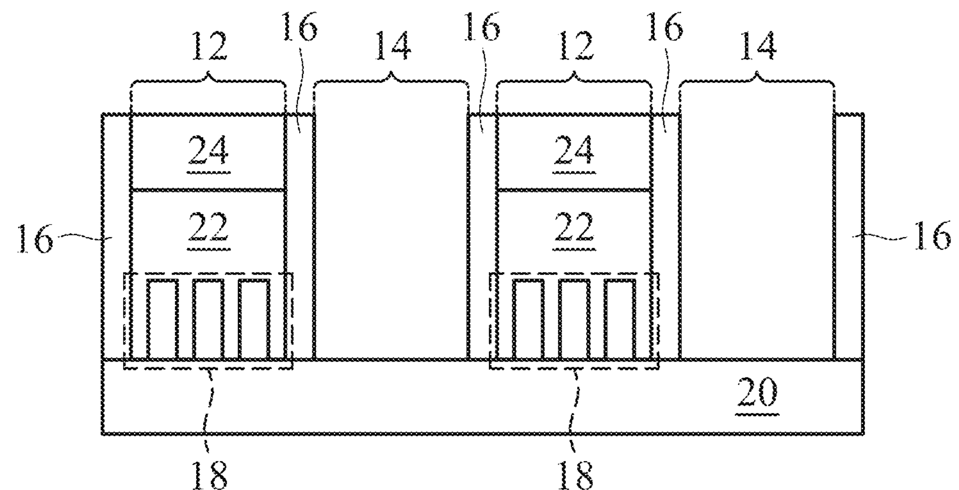

Next, as shown in FIG. 17D, a color filter 24 is formed on the IR-cut filter 22 in each IR-cut pixel 12.

Figure 17E:
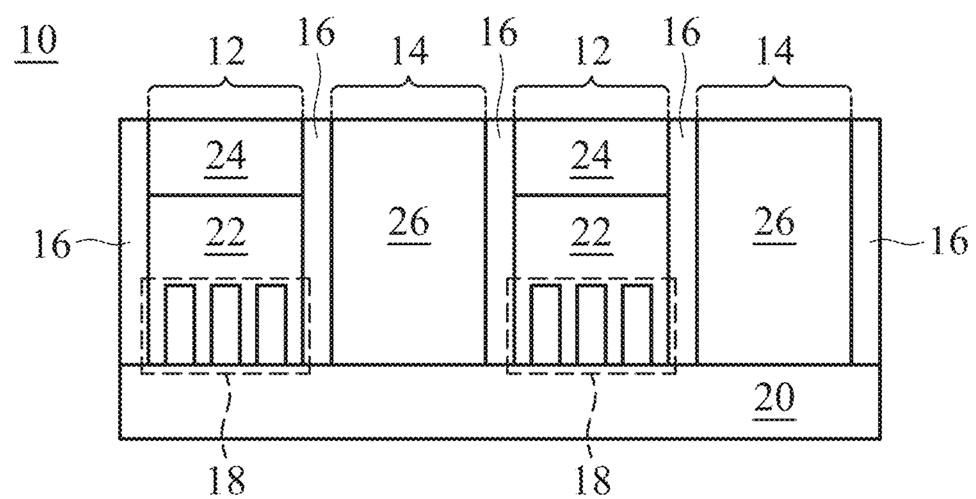

Next, as shown in FIG. 17E, an IR-pass filter 26 is formed in each IR-pass pixel 14. Thus, the fabrication of an optical device 10 is complete.

Figure 18:
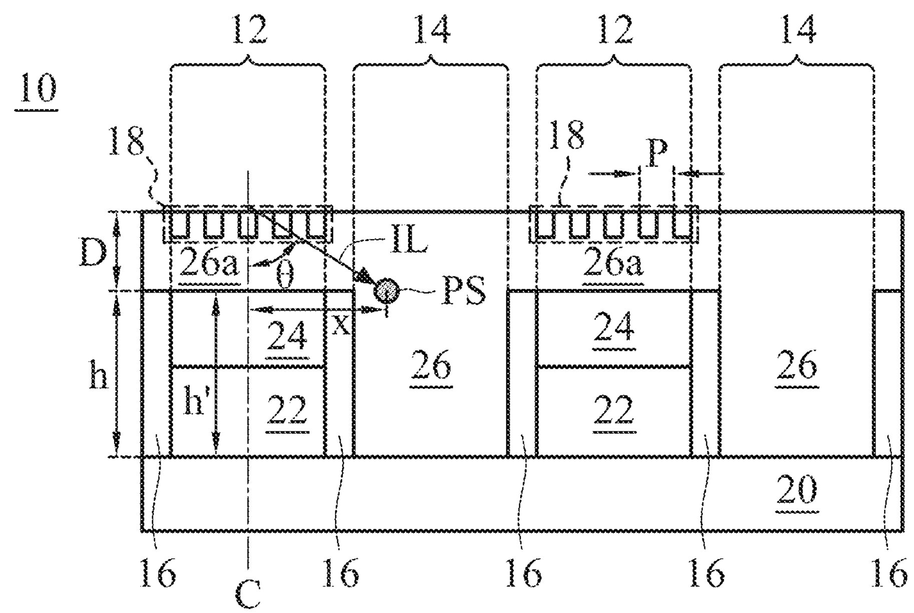
FIG. 18 is a cross-sectional view of an optical device in accordance with one embodiment of the invention.

Referring to FIG. 18, in accordance with one embodiment of the present invention, an optical device 10 is provided. FIG. 18 shows a cross-sectional view of the optical device 10.

As shown in FIG. 18, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 18, each IR-pass pixel 14 includes an IR-pass filter 26. The IR-pass filter 26 further extends towards the direction away from the substrate 20 and covers the adjacent IR-cut pixel 12 to form an extended portion 26*a* over the adjacent IR-cut pixel 12. The grating structure 18 is disposed in and exposed from the extended portion 26*a*. The pitch P of the grating structure 18 is in a range from about 0.1 μm to about 0.7 μm. The pitch P is defined by λ/sin θ (i.e. $P=\lambda/\sin\theta$). In the formula, λ is the wavelength of the incident light IL, and θ is the diffraction angle of the incident light IL through the grating structure 18. In addition, θ is defined by $\tan^{-1}$ D/x (i.e. $\theta=\tan^{-1} D/x$). In the formula, D is the thickness of the extended portion 26*a* of the IR-pass filter 26, and x is the distance from the center C of the adjacent IR-cut pixel 12 to the position PS where the incident light IL enters the IR-pass pixel 14 after diffraction. In some embodiments, the grating structure 18 is made of the same material as the grid 16. This may be a low-refractive-index organic material, for example. The grating structure 18 is designed for filtering out IR light (such as 850 nm or 940 nm), but the present invention is not limited thereto.

In FIG. 18, each IR-cut pixel 12 includes an IR-cut filter 22 and a color filter 24. The color filter 24 is disposed on the IR-cut filter 22. In some embodiments, the height h of the grid 16 is the same as the height h' of the IR-cut filter 22 plus the color filter 24. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

The grating structure 18 with a proper dimension which is disposed in and exposed from the extended portion 26*a* of the IR-pass filter 26 has an improved light-splitting effect. When the incident light IL with different wavelengths passes through the grating structure 18, different diffraction angles θ are produced from the incident light IL. Long-wavelength incident light (ex. IR light) has a large diffraction angle θ. When IR light is diffracted and enters the IR-pass filter 26, with the grid 16 having a proper height, the IR light can thus be trapped inside the IR-pass filter 26, improving the reception of IR-light image information of the IR-pass pixel 14.

Figure 19:
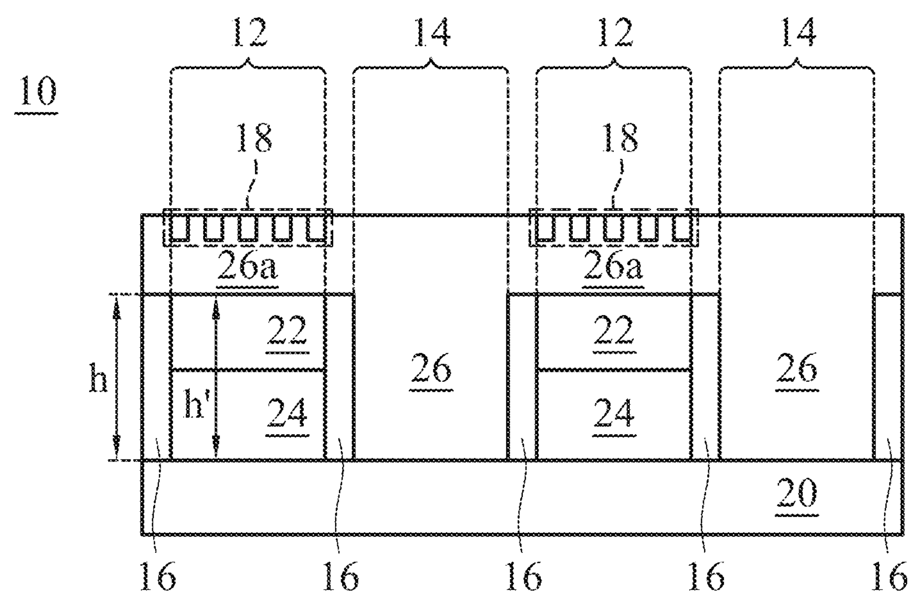
FIG. 19 is a cross-sectional view of an optical device in accordance with one embodiment of the invention.

Referring to FIG. 19, in accordance with one embodiment of the present invention, an optical device 10 is provided. FIG. 19 shows a cross-sectional view of the optical device 10.

As shown in FIG. 19, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 19, each IR-pass pixel 14 includes an IR-pass filter 26. The IR-pass filter 26 further extends towards the direction away from the substrate 20 and covers the adjacent IR-cut pixel 12 to form an extended portion 26*a* over the adjacent IR-cut pixel 12. The grating structure 18 is disposed in and exposed from the extended portion 26*a*. The dimensions and material of the grating structure 18 are similar to those of the grating structure 18 in FIG. 18. It is not repeated here. The grating structure 18 is designed for filtering out IR light (such as 850nm or 940nm), but the present invention is not limited thereto.

In FIG. 19, each IR-cut pixel 12 includes an IR-cut filter 22 and a color filter 24. The IR-cut filter 22 is disposed on the color filter 24. In some embodiments, the height h of the grid 16 is the same as the height h' of the IR-cut filter 22 plus the color filter 24. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Figure 20:
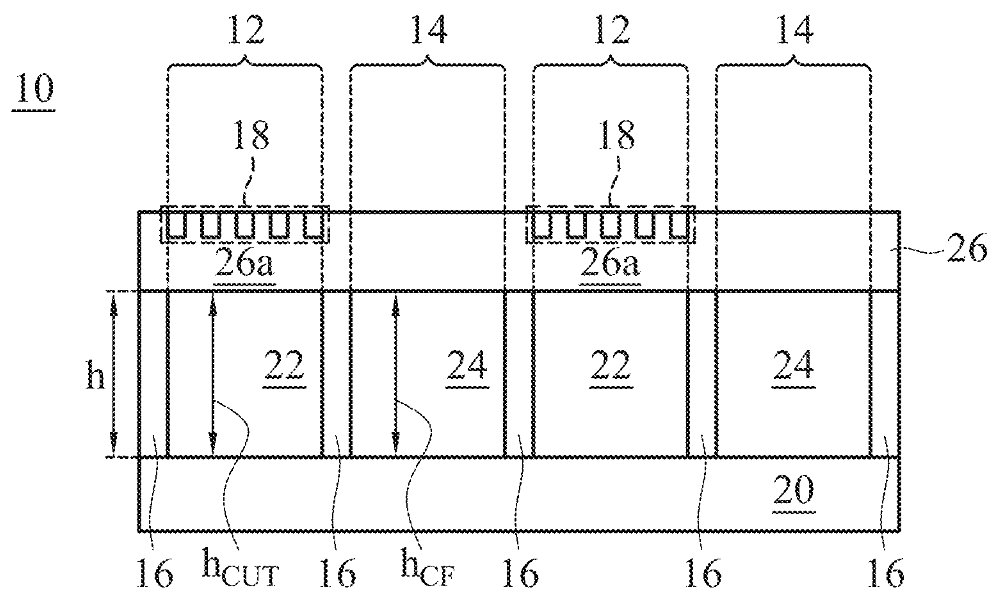
FIG. 20 is a cross-sectional view of an optical device in accordance with one embodiment of the invention.

Referring to FIG. 20, in accordance with one embodiment of the present invention, an optical device 10 is provided. FIG. 20 shows a cross-sectional view of the optical device 10.

As shown in FIG. 20, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 20, each IR-pass pixel 14 includes a color filter 24. The optical device 10 further includes an IR-pass filter 26 covering the IR-cut pixels 12 and the IR-pass pixels 14. The grating structure 18 is disposed in and exposed from the IR-pass filter 26. The dimensions and material of the grating structure 18 are similar to those of the grating structure 18 in FIG. 18. It is not repeated here. The grating structure 18 is designed for filtering out IR light (such as 850 nm or 940 nm), but the present invention is not limited thereto.

In FIG. 20, each IR-cut pixel 12 includes an IR-cut filter 22. In some embodiments, the height h of the grid 16 is the same as the height $h_{CUT}$ of the IR-cut filter 22. In some embodiments, the height h of the grid 16 is the same as the height $h_{CF}$ of the color filter 24. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Figure 21:
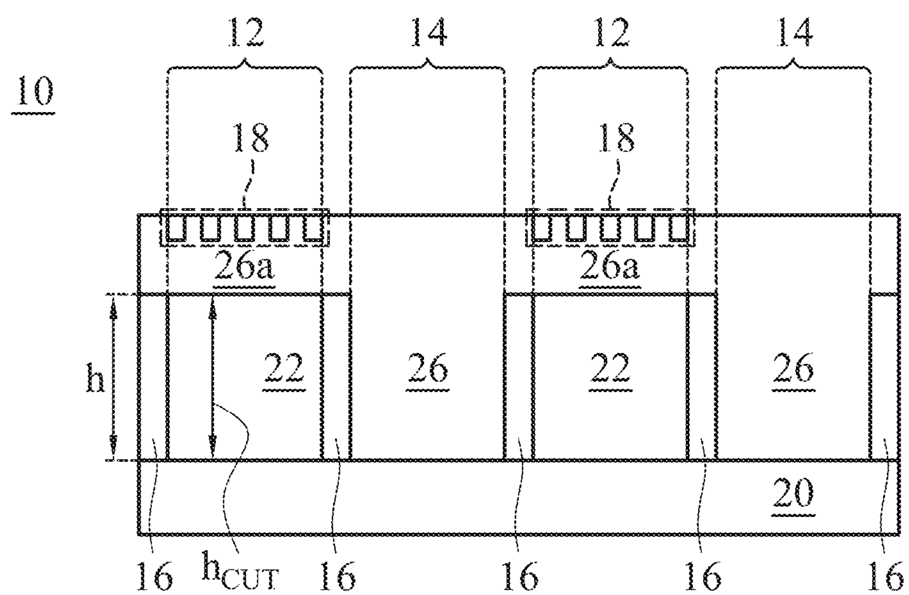
FIG. 21 is a cross-sectional view of an optical device in accordance with one embodiment of the invention.

Referring to FIG. 21, in accordance with one embodiment of the present invention, an optical device 10 is provided. FIG. 21 shows a cross-sectional view of the optical device 10.

As shown in FIG. 21, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 21, each IR-pass pixel 14 includes an IR-pass filter 26. The IR-pass filter 26 further extends towards the direction away from the substrate 20 and covers the adjacent IR-cut pixel 12 to form an extended portion **26*a* over the adjacent IR-cut pixel 12. The grating structure 18 is disposed in and exposed from the extended portion 26*a*. The dimensions and material of the grating structure 18 are similar to those of the grating structure 18 in FIG. 18. It is not repeated here. The grating structure 18** is designed for filtering out IR light (such as 850 nm or 940 nm), but the present invention is not limited thereto.

In FIG. 21, each IR-cut pixel 12 includes an IR-cut filter 22. In some embodiments, the height h of the grid 16 is the same as the height hcuT of the IR-cut filter 22. In some embodiments, the IR-cut filter 22 represents a filter that can filter out IR light. In some embodiments, the IR-pass filter 26 represents a filter that allows IR light to pass through.

Figure 22:
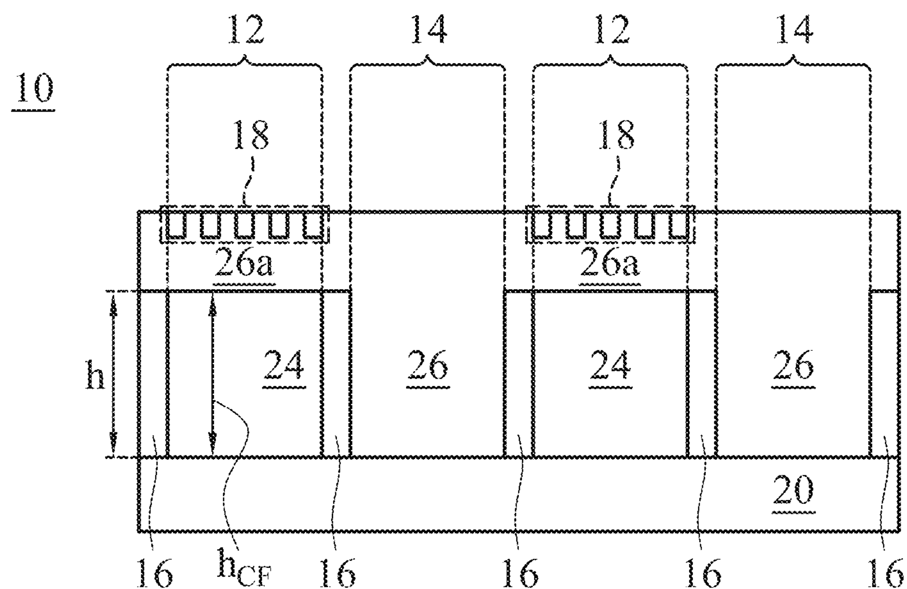
FIG. 22 is a cross-sectional view of an optical device in accordance with one embodiment of the invention.

Referring to FIG. 22, in accordance with one embodiment of the present invention, an optical device 10 is provided. FIG. 22 shows a cross-sectional view of the optical device 10.

As shown in FIG. 22, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 22, each IR-pass pixel 14 includes an IR-pass filter 26. The IR-pass filter 26 further extends towards the direction away from the substrate 20 and covers the adjacent IR-cut pixel 12 to form an extended portion **26*a* over the adjacent IR-cut pixel 12. The grating structure 18 is disposed in and exposed from the extended portion 26*a*. The dimensions and material of the grating structure 18 are similar to those of the grating structure 18 in FIG. 18. It is not repeated here. The grating structure 18** is designed for filtering out IR light (such as 850 nm or 940 nm), but the present invention is not limited thereto.

In FIG. 22, each IR-cut pixel 12 includes a color filter 24. In some embodiments, the height h of the grid 16 is the same as the height hcF of the color filter 24. In some embodiments, the color filter 24 includes a red (R) color filter, a green (G) color filter or a blue (B) color filter. In some embodiments, the IR-pass filter 26 represents a filter that allows IR light to pass through.

Figure 23:
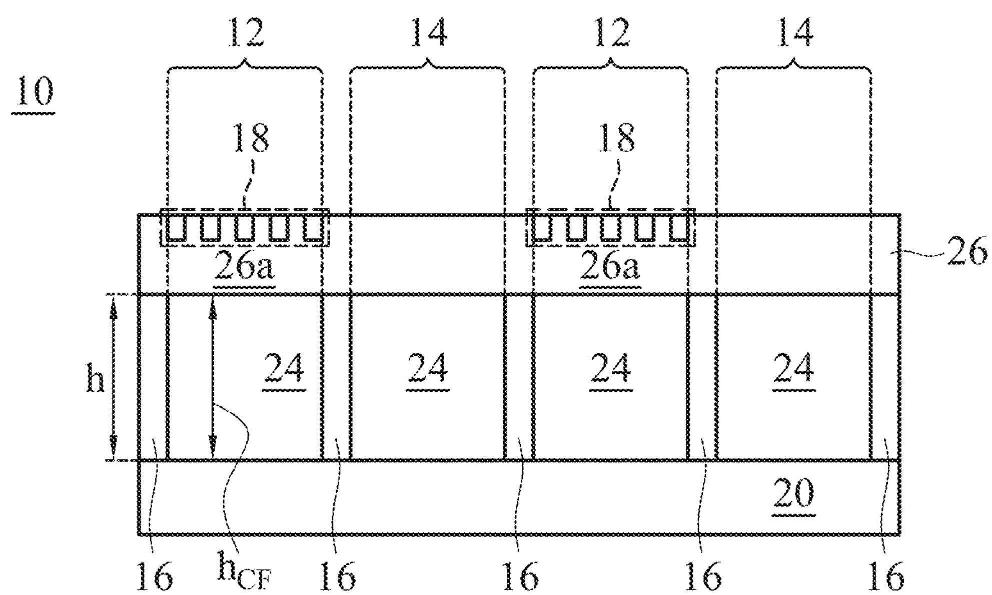
FIG. 23 is a cross-sectional view of an optical device in accordance with one embodiment of the invention.

Referring to FIG. 23, in accordance with one embodiment of the present invention, an optical device 10 is provided. FIG. 23 shows a cross-sectional view of the optical device 10.

As shown in FIG. 23, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 23, each IR-pass pixel 14 includes a color filter 24. The optical device 10 further includes an IR-pass filter 26 covering the IR-cut pixels 12 and the IR-pass pixels 14. The grating structure 18 is disposed in and exposed from the IR-pass filter 26. The dimensions and material of the grating structure 18 are similar to those of the grating structure 18 in FIG. 18. It is not repeated here. The grating structure 18 is designed for filtering out IR light (such as 850 nm or 940 nm), but the present invention is not limited thereto.

In FIG. 23, each IR-cut pixel 12 includes a color filter 24. In some embodiments, the height h of the grid 16 is the same as the height hcF of the color filter 24. In some embodiments, the color filter 24 includes a red (R) color filter, a green (G) color filter or a blue (B) color filter. In some embodiments, the IR-pass filter 26 represents a filter that allows IR light to pass through.

Figure 24:
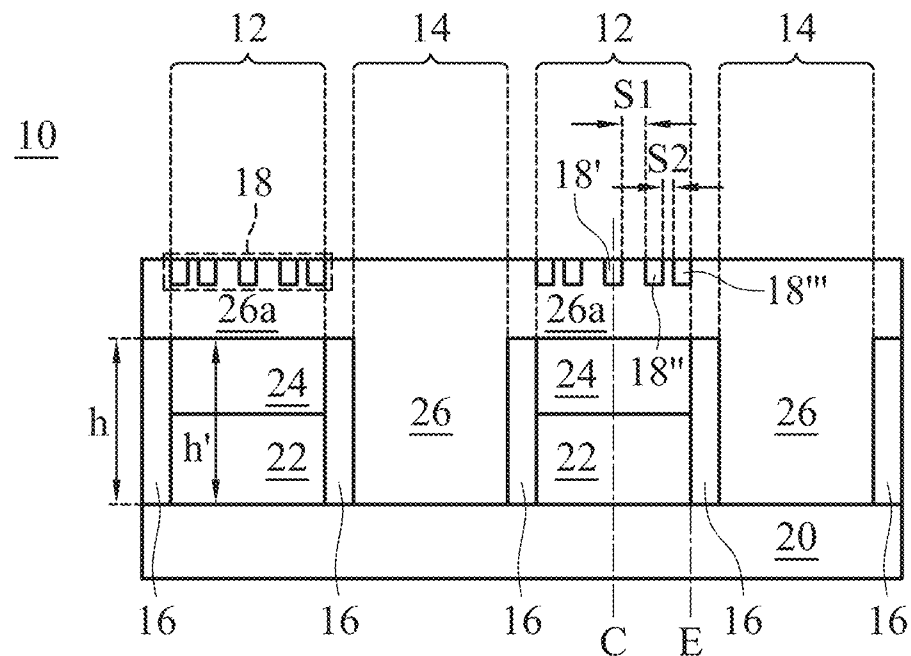
FIG. 24 is a cross-sectional view of an optical device in accordance with one embodiment of the invention.

Referring to FIG. 24, in accordance with one embodiment of the present invention, an optical device 10 is provided. FIG. 24 shows a cross-sectional view of the optical device 10.

As shown in FIG. 24, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 24, each IR-pass pixel 14 includes an IR-pass filter 26. The IR-pass filter 26 further extends towards the direction away from the substrate 20 and covers the adjacent IR-cut pixel 12 to form an extended portion **26*a* over the adjacent IR-cut pixel 12. The grating structure 18 is disposed in and exposed from the extended portion 26***a*. The grating structure 18 includes a plurality of separated portions, for example, a first separated portion 18', a second separated portion 18" and a third separated portion 18". The first separated portion 18' is located at the center C of the IR-cut pixel 12. The third separated portion 18''' is adjacent to the edge E of the IR-cut pixel 12. The second separated portion 18" is located between the first separated portion 18' and the third separated portion 18". The separated portions have variable spacing (multi-period). For example, the spacing S1 between the first separated portion 18' and the second separated portion 18" is larger than the spacing S2 between the second separated portion 18" and the third separated portion 18'''. In some embodiments, the material of the grating structure 18 is the same as that of the grid 16, for example, a low-refractive-index organic material. The grating structure 18 is designed for filtering out IR light (such as 850 nm or 940 nm), but the present invention is not limited thereto.

In FIG. 24, each IR-cut pixel 12 includes an IR-cut filter 22 and a color filter 24. The color filter 24 is disposed on the IR-cut filter 22. In some embodiments, the height h of the grid 16 is the same as the height h' of the IR-cut filter 22 plus the color filter 24. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Figure 25:
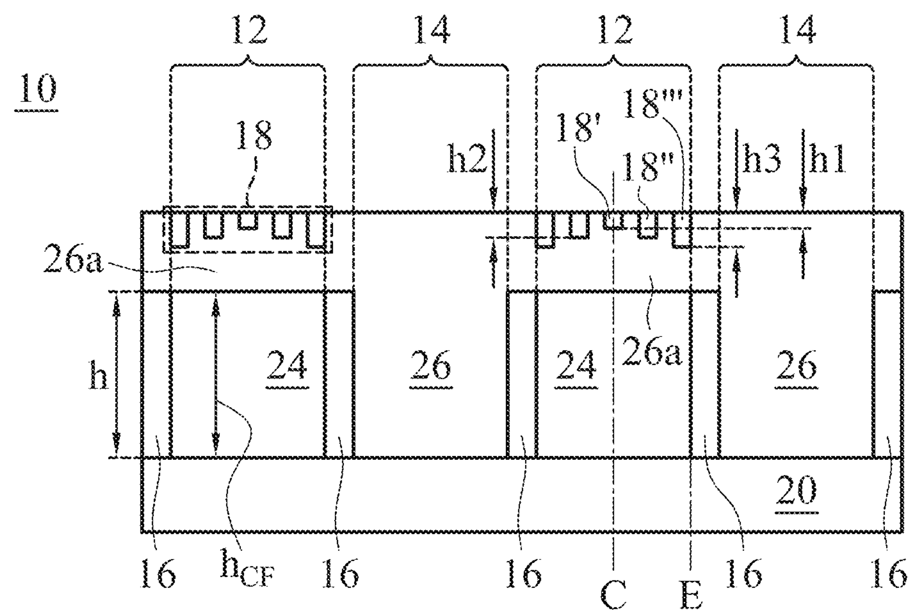
FIG. 25 is a cross-sectional view of an optical device in accordance with one embodiment of the invention.

Referring to FIG. 25, in accordance with one embodiment of the present invention, an optical device 10 is provided. FIG. 25 shows a cross-sectional view of the optical device 10.

As shown in FIG. 25, the optical device 10 includes a plurality of IR-cut pixels 12, a plurality of IR-pass pixels 14 and a plurality of grids 16. Each IR-cut pixel 12 includes a grating structure 18. The grids 16 are disposed on a substrate 20 and surround the IR-cut pixels 12 and the IR-pass pixels 14. In some embodiments, the grid 16 includes any suitable low-refractive-index organic material.

In FIG. 25, each IR-pass pixel 14 includes an IR-pass filter 26. The IR-pass filter 26 further extends towards the direction away from the substrate 20 and covers the adjacent IR-cut pixel 12 to form an extended portion 26*a* over the adjacent IR-cut pixel 12. The grating structure 18 is disposed in and exposed from the extended portion 26*a*. The grating structure 18 includes a plurality of separated portions, for example, a first separated portion 18', a second separated portion 18" and a third separated portion 18'''. The first separated portion 18' is located at the center C of the IR-cut pixel 12. The third separated portion 18''' is adjacent to the edge E of the IR-cut pixel 12. The second separated portion 18" is located between the first separated portion 18' and the third separated portion 18'''. The separated portions have variable height (multi-order). The height of the separated portions (ex. 18', 18" and 18''') increases from the center C to the edge E of the IR-cut pixel 12. For example, the height h3 of the third separated portion 18''' is larger than the height h2 of the second separated portion 18". The height h2 of the second separated portion 18" is larger than the height hl of the first separated portion 18'. In some embodiments, the height of the separated portions (ex. 18', 18" and 18''') decreases from the center C to the edge E of the IR-cut pixel 12. For example, the height h1 of the first separated portion 18' is larger than the height h2 of the second separated portion 18". The height h2 of the second separated portion 18" is larger than the height h3 of the third separated portion 18''' (not shown). In some embodiments, the material of the grating structure 18 is the same as that of the grid 16, for example, a low-refractive-index organic material. The grating structure 18 is designed for filtering out IR light (such as 850 nm or 940 nm), but the present invention is not limited thereto.

In FIG. 25, each IR-cut pixel 12 includes a color filter 24. In some embodiments, the height h of the grid 16 is the same as the height hcF of the color filter 24. In some embodiments, the color filter 24 includes a red (R) color filter, a green (G) color filter or a blue (B) color filter. In some embodiments, the IR-pass filter 26 represents a filter that allows IR light to pass through.

Figure 26:
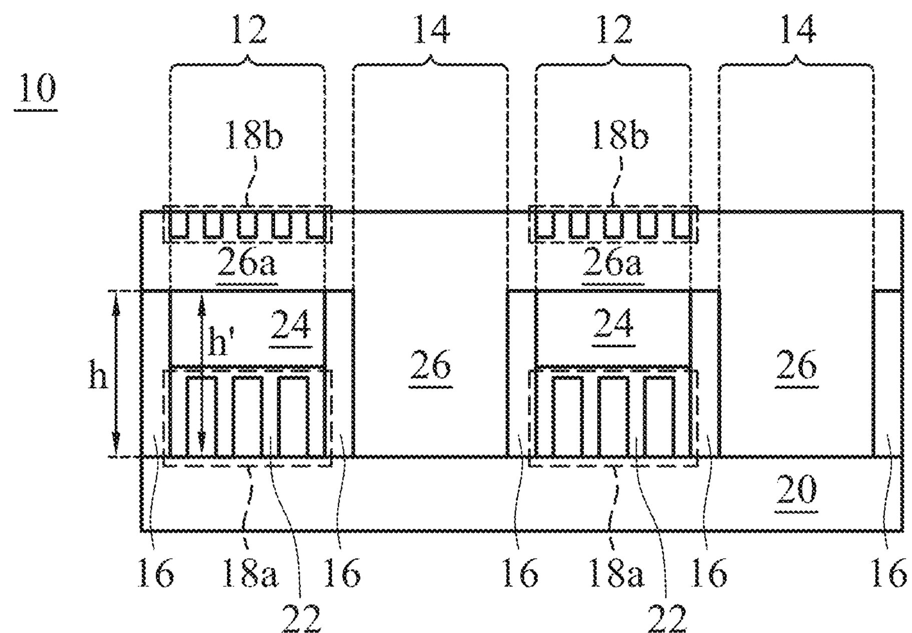
FIG. 26 is a cross-sectional view of an optical device in accordance with one embodiment of the invention.

Referring to FIG. 26, in accordance with one embodiment of the present invention, an optical device 10 is provided. FIG. 26 shows a cross-sectional view of the optical device 10.

As shown in FIG. 26, the optical device 10 includes a plurality of IR-cut pixels 12, a plurality of IR-pass pixels 14 and a plurality of grids 16. Each IR-cut pixel 12 includes two grating structures, for example, a first grating structure 18*a* and a second grating structure 18*b*. The grids 16 are disposed on a substrate 20 and surround the IR-cut pixels 12 and the IR-pass pixels 14. In some embodiments, the grid 16 includes any suitable low-refractive-index organic material.

In FIG. 26, the first grating structure 18*a* is disposed on the substrate 20. The dimensions and material of the first grating structure 18*a* are similar to those of the grating structure 18 in FIG. 1. It is not repeated here. The first grating structure 18*a* is designed for filtering out IR light (such as 850 nm or 940 nm), but the present invention is not limited thereto.

In FIG. 26, each IR-cut pixel 12 includes an IR-cut filter 22 and a color filter 24. The IR-cut filter 22 covers and fills in the first grating structure 18*a*. The color filter 24 is disposed on the IR-cut filter 22. Each IR-pass pixel 14 includes an IR-pass filter 26. The IR-pass filter 26 further extends towards the direction away from the substrate 20 and covers the adjacent IR-cut pixel 12 to form an extended portion 26*a* over the adjacent IR-cut pixel 12. The second grating structure 18*b* is disposed in and exposed from the extended portion 26*a*. The dimensions and material of the second grating structure 18*b* are similar to those of the grating structure 18 in FIG. 18. It is not repeated here. Similarly, the second grating structure 18*b* is designed for filtering out IR light (such as 850 nm or 940 nm), but the present invention is not limited thereto. In some embodiments, the height h of the grid 16 is the same as the height h' of the IR-cut filter 22 plus the color filter 24. In some embodiments, the IR-cut filter 22 represents a filter that can filter out IR light. In some embodiments, the color filter 24 includes a red (R) color filter, a green (G) color filter or a blue (B) color filter. In some embodiments, the IR-pass filter 26 represents a filter that allows IR light to pass through.

Referring to FIGS. 27A-27E, in accordance with one embodiment of the present invention, a method for fabricating an optical device is provided. FIGS. 27A-27E show cross-sectional views of the method for fabricating an optical device.

Figure 27A:
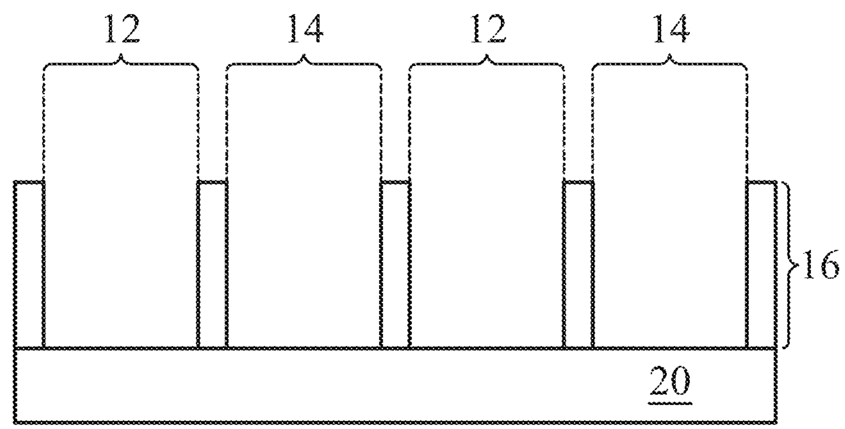
FIGS. 27A-27E are cross-sectional views of a method for fabricating an optical device in accordance with one embodiment of the invention.

First, as shown in FIG. 27A, a substrate 20 with a plurality of grids 16 disposed thereon is provided. The grids 16 define a plurality of IR-cut pixels 12 and a plurality of IR-pass pixels 14. In some embodiments, the grid 16 includes any suitable low-refractive-index organic material.

Figure 27B:
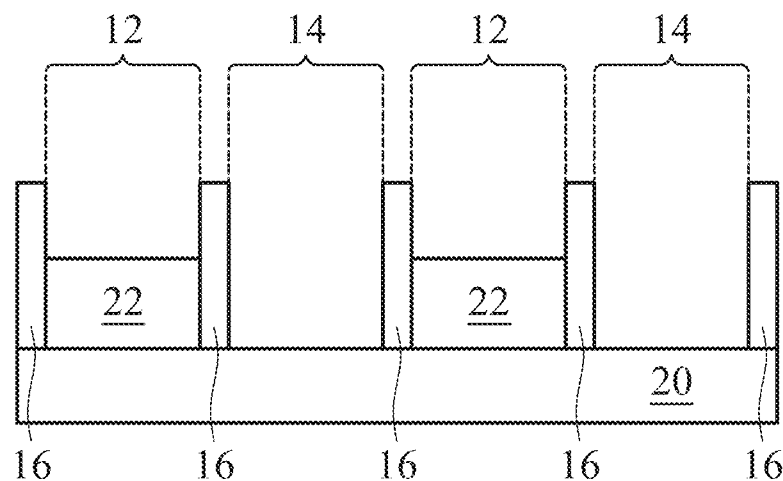

Next, as shown in FIG. 27B, an IR-cut filter 22 is formed in each IR-cut pixel 12.

Figure 27C:
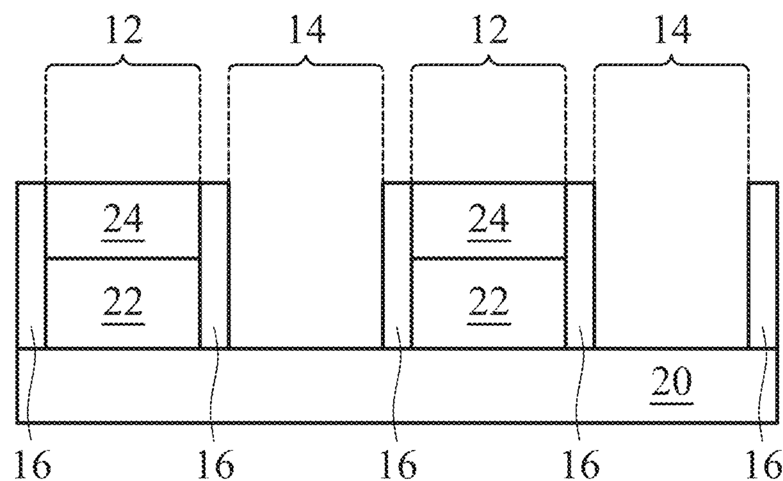

Next, as shown in FIG. 27C, a color filter 24 is formed on the IR-cut filter 22 in each IR-cut pixel 12.

Figure 27D:
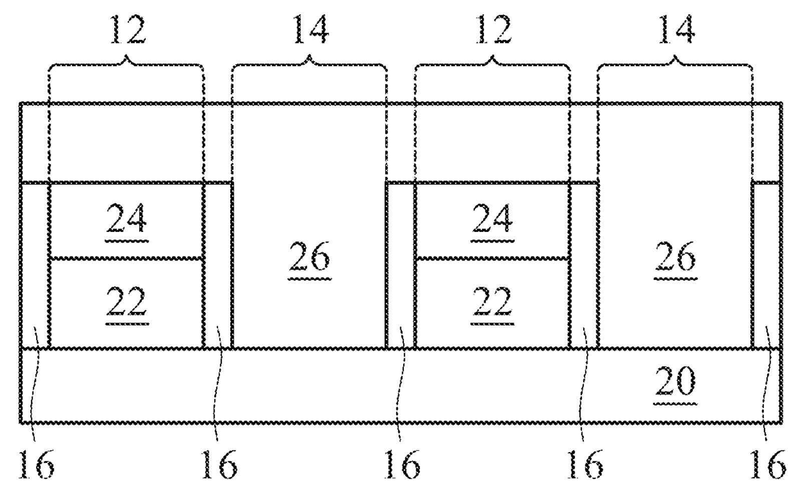

Next, as shown in FIG. 27D, an IR-pass filter 26 is formed in each IR-pass pixel 14 and further extends towards the direction away from the substrate 20 and covers the adjacent IR-cut pixel 12.

Figure 27E:
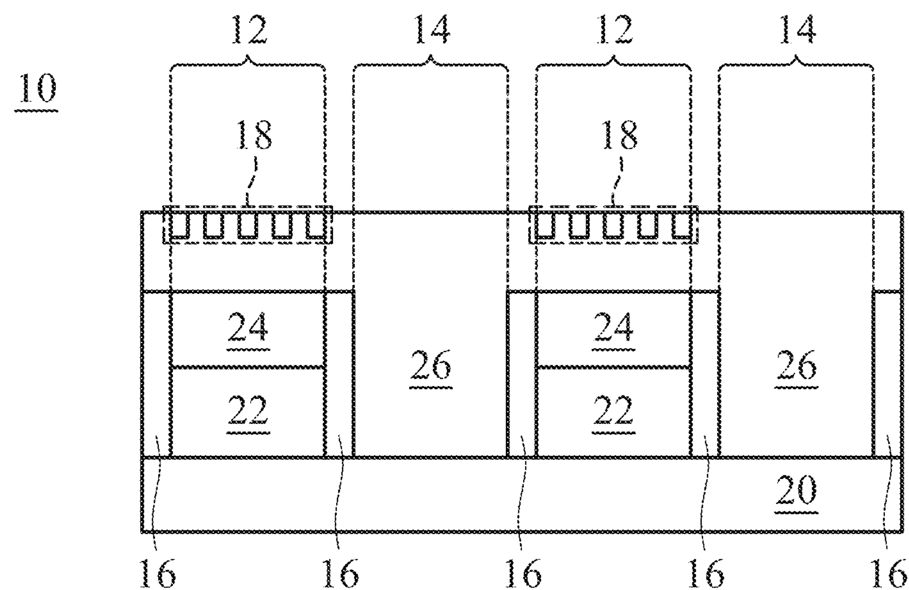

Next, as shown in FIG. 27E, a grating structure 18 is disposed in and exposed from the IR-pass filter 26. In some embodiments, the material of the grating structure 18 is the same as that of the grid 16, for example, a low-refractive-index organic material. Thus, the fabrication of an optical device 10 is complete.

The present invention provides the grating structure with the specific dimensions, for example the specific pitch and height, located on the substrate within the IR-cut pixel. When IR light enters the grating structure, the IR light forms a resonance (wave-guide) mode within the grating structure and then reflects out the IR-cut pixel. The setting of the grating structure is capable of reducing the penetration of the IR light and increasing the reflectivity of the IR light in the IR-cut pixel. Therefore, the pixel (ex. the IR-cut pixel) that does not expect IR light to penetrate will not receive IR light, effectively reducing crosstalk. That is, the ability of the IR-cut pixel to filter out IR light is greatly improved.

In the present invention, the grating structure with a proper dimension located in and exposed from the extended IR-pass filter within the IR-cut pixel provides an improved light-splitting effect. When incident light with different wavelengths passes through the grating structure, different diffraction angles are produced from the incident light. Especially, long-wavelength incident light (ex. IR light) has a large diffraction angle. Therefore, when IR light is diffracted and enters the IR-pass filter, with the low-n grid having a proper height, the IR light can thus be trapped inside the IR-pass filter, improving the reception of IR-light image information of the IR-pass pixel.

In addition, all the required image information, for example red-light information, green-light information, blue-light information and all-light information, in each target pixel can be reproduced by the algorithm (combined with the weighting factor matrix and the color-filter mosaic pattern) provided by the present invention. Therefore, the optical device can present the most realistic colors.

Although some embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. An optical device, comprising:

a plurality of IR-cut pixels, wherein each IR-cut pixel comprises a first grating structure;

a plurality of IR-pass pixels; and a plurality of grids surrounding the plurality of IR-cut pixels and the plurality of IR-pass pixels, wherein each IR-cut pixel further comprises an IR-cut filter and a color filter, wherein the IR-cut filter covers and fills in the first grating structure and the color filter is disposed on the IR-cut filter, or the color filter covers and fills in the first grating structure and the IR-cut filter is disposed on the color filter.

2. The optical device as claimed in claim 1, wherein the first grating structure has a pitch which is in a range from 0.1 μm to 0.7 μm and a height which is in a range from 0.05 μm to 0.5 μm.

3. The optical device as claimed in claim 1, wherein each IR-pass pixel comprises an IR-pass filter.

4. The optical device as claimed in claim 1, wherein each IR-pass pixel comprises a color filter.

5. The optical device as claimed in claim 1, further comprising a plurality of microlenses above the plurality of IR-cut pixels and the plurality of IR-pass pixel.

6. The optical device as claimed in claim 1, wherein each IR-cut pixel further comprises an IR-pass filter, and the first grating structure is disposed on a top surface of the IR-pass filter.

7. The optical device as claimed in claim 6, wherein the first grating structure has a pitch which is in a range from 0.1 μm to 0.7μm.

8. The optical device as claimed in claim 7, wherein the pitch is defined by $\lambda/\sin\theta$, wherein $\lambda$ is a wavelength of an incident light, and $\theta$ is a diffraction angle of the incident light through the first grating structure.

9. The optical device as claimed in claim 8, wherein $\theta$ is defined by $\tan^{-1} D/x$, wherein D is a thickness of the IR-pass filter, and x is a distance from a center of the IR-cut pixel to a position where the incident light enters an adjacent IR-pass pixel after diffraction.

10. The optical device as claimed in claim 9, wherein the first grating structure comprises a plurality of separated portions, and the plurality of separated portions have variable height and spacing.

11. The optical device as claimed in claim 6, wherein each IR-cut pixel further comprises a second grating structure under the first grating structure.

12. The optical device as claimed in claim 11, wherein each IR-cut pixel further comprises an IR-cut filter covering and filling in the second grating structure.

13. The optical device as claimed in claim 11, wherein each IR-cut pixel further comprises a color filter covering and filling in the second grating structure.

14. The optical device as claimed in claim 1, wherein each grid comprises low-refractive-index organic material.

15. The optical device as claimed in claim 14, wherein the first grating structure and the plurality of grids have the same material.

16. A method for fabricating an optical device, comprising:

providing a substrate with a plurality of grids;

etching a part of the plurality of grids to form a plurality of grating structures, leaving a part of the plurality of grids to define a plurality of IR-cut pixels and a plurality of IR-pass pixels, wherein each IR-cut pixel comprises a grating structure;

forming an IR-cut filter to cover and fill in the grating structure in each IR-cut pixel;

forming a color filter on the IR-cut filter in each IR-cut pixel; and forming an IR-pass filter in each IR-pass pixel.

* * * * *